(12) United States Patent
Nunez-Regueiro et al.

(10) Patent No.: US 8,609,260 B2
(45) Date of Patent: *Dec. 17, 2013

(54) COATED ARTICLE WITH LOW-E COATING INCLUDING TIN OXIDE INTERLAYER

(71) Applicant: Guardian Industries Corp., Auburn Hills, MI (US)

(72) Inventors: Jose Nunez-Regueiro, Ann Arbor, MI (US); Anton Dietrich, Fontnas (CH); Philip J. Lingle, Temperance, MI (US); Scott V. Thomsen, South Lyon, MI (US); Hong Wang, Shanghai (CN); Jean-Marc Lemmer, Ann Arbor, MI (US); Nancy Bassett, Macedon, NY (US); Bryce Corsner, Seneca Falls, NY (US)

(73) Assignees: Guardian Industries Corp., Auburn Hills, MI (US); Centre Luxembourg de Recherches pour le Verre et la Ceramique S.A. (C.R.V.C.), Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 13/719,453

(22) Filed: Dec. 19, 2012

(65) Prior Publication Data

US 2013/0108848 A1     May 2, 2013

Related U.S. Application Data

(60) Continuation of application No. 13/367,516, filed on Feb. 7, 2012, now Pat. No. 8,357,458, which is a continuation of application No. 12/929,404, filed on Jan. 21, 2011, now Pat. No. 8,124,237, which is a continuation of application No. 11/641,827, filed on Dec. 20, 2006, now Pat. No. 7,897,260, which is a division of application No. 10/797,561, filed on Mar. 11, 2004, now Pat. No. 7,217,460.

(51) Int. Cl.
*B32B 15/04* (2006.01)
*B32B 17/06* (2006.01)

(52) U.S. Cl.
USPC ........... 428/701; 428/432; 428/689; 428/699; 428/702

(58) Field of Classification Search
USPC ......... 428/426, 428, 432, 433, 689, 699, 701, 428/702
See application file for complete search history.

(56) References Cited

U.S. PATENT DOCUMENTS

| | | | |
|---|---|---|---|
| 4,806,220 | A | 2/1989 | Finley |
| 4,898,789 | A | 2/1990 | Finley |

(Continued)

FOREIGN PATENT DOCUMENTS

| | | |
|---|---|---|
| EP | 0 877 005 | 11/1998 |
| EP | 2 316 802 | 5/2001 |

(Continued)

OTHER PUBLICATIONS

U.S. Appl. No. 13/367,516, filed Feb. 7, 2012; Nunez-Regueiro et al.

(Continued)

*Primary Examiner* — David Sample
*Assistant Examiner* — Lauren Colgan
(74) *Attorney, Agent, or Firm* — Nixon & Vanderhye P.C.

(57) ABSTRACT

A coated article is provided which may be heat treated (e.g., thermally tempered) in certain instances. In certain example embodiments, an interlayer of or including a metal oxide such as tin oxide is provided under an infrared (IR) reflecting layer so as to be located between respective layers comprising silicon nitride and zinc oxide. It has been found that the use of such a tin oxide inclusive interlayer results in significantly improved mechanical durability, thermal stability and/or haze characteristics.

8 Claims, 6 Drawing Sheets

(56) References Cited

U.S. PATENT DOCUMENTS

| | | |
|---|---|---|
| 5,110,662 A | 5/1992 | Depauw et al. |
| 5,270,517 A | 12/1993 | Finley |
| 5,557,462 A | 9/1996 | Hartig et al. |
| 5,688,585 A | 11/1997 | Lingle et al. |
| 5,718,980 A | 2/1998 | Koch et al. |
| 5,821,001 A | 10/1998 | Arbab et al. |
| 6,045,896 A | 4/2000 | Boire et al. |
| 6,090,481 A | 7/2000 | Depauw et al. |
| 6,210,784 B1 * | 4/2001 | Rondeau et al. ............... 428/212 |
| 6,287,675 B1 | 9/2001 | Guiselin et al. |
| 6,322,881 B1 | 11/2001 | Boire et al. |
| 6,355,334 B1 | 3/2002 | Rondeau et al. |
| 6,445,503 B1 | 9/2002 | Lingle |
| 6,524,688 B1 | 2/2003 | Eby et al. |
| 6,572,940 B1 | 6/2003 | Noethe et al. |
| 6,576,349 B2 | 6/2003 | Lingle et al. |
| 6,625,875 B2 | 9/2003 | Sol |
| 6,632,491 B1 | 10/2003 | Thomsen et al. |
| 6,686,050 B2 | 2/2004 | Lingle et al. |
| 7,081,302 B2 | 7/2006 | Lemmer et al. |
| 7,150,916 B2 | 12/2006 | Lemmer et al. |
| 7,217,460 B2 | 5/2007 | Nunez-Regueiro et al. |
| 7,534,496 B2 | 5/2009 | Lemmer et al. |
| 7,897,260 B2 | 3/2011 | Nunez-Regueiro et al. |
| 8,124,237 B2 | 2/2012 | Nunez-Regueiro et al. |
| 8,357,458 B2 | 1/2013 | Nunez-Regueiro et al. |
| 2002/0045037 A1 | 4/2002 | Boire et al. |
| 2002/0064662 A1 | 5/2002 | Lingle et al. |
| 2002/0102352 A1 * | 8/2002 | Hartig et al. ................... 427/165 |
| 2002/0192474 A1 | 12/2002 | Lingle |
| 2003/0049464 A1 | 3/2003 | Glenn et al. |
| 2003/0150711 A1 | 8/2003 | Laird |
| 2003/0170466 A1 | 9/2003 | Stachowiak |
| 2003/0194570 A1 | 10/2003 | Lingle et al. |
| 2003/0235719 A1 * | 12/2003 | Grimal et al. .................. 428/698 |
| 2004/0005467 A1 * | 1/2004 | Neuman et al. ................ 428/432 |
| 2004/0009356 A1 | 1/2004 | Medwick et al. |
| 2004/0086723 A1 * | 5/2004 | Thomsen et al. ............. 428/426 |
| 2004/0101694 A1 * | 5/2004 | Lingle et al. .................. 428/426 |
| 2004/0146721 A1 * | 7/2004 | Hartig et al. .................. 428/432 |

FOREIGN PATENT DOCUMENTS

| | | |
|---|---|---|
| EP | 1 174 397 | 1/2002 |
| FR | 2 781 789 | 2/2000 |
| WO | WO 01/44131 | 6/2001 |
| WO | WO 2006/020753 | 2/2006 |

OTHER PUBLICATIONS

International Search Report mailed Jul. 6, 2005.

* cited by examiner

COATED ARTICLE WITH LOW-E COATING INCLUDING TIN OXIDE INTERLAYER

This application is a continuation of application Ser. No. 13/367,516, filed Feb. 7, 2012 (now U.S. Pat. No. 8,357,458), which is a continuation of application Ser. No. 12/929,404, filed Jan. 21, 2011 (now U.S. Pat. No. 8,124,137), which is a CON of Ser. No. 11/641,827, filed Dec. 20, 2006 (now U.S. Pat. No. 7,897,260), which is a DIV of Ser. No. 10/797,561, filed Mar. 11, 2004 (now U.S. Pat. No. 7,217,460), the entire disclosures of which are all hereby incorporated herein by reference in this application.

This invention relates to a coated article including a low-E coating. In certain example embodiments, an interlayer comprising tin oxide or the like may be provided under an infrared (IR) reflecting layer and in particular between respective layers comprising silicon nitride and zinc oxide. In certain example embodiments, the coated article may be heat treated (e.g., thermally tempered, heat bent and/or heat strengthened). Coated articles according to certain example embodiments of this invention may be used in the context of insulating glass (IG) window units, vehicle windows, other types of windows, or in any other suitable application.

BACKGROUND OF THE INVENTION

Coated articles are known in the art for use in window applications such as insulating glass (IG) window units, vehicle windows, and/or the like. It is known that in certain instances, it is desirable to heat treat (e.g., thermally temper, heat bend and/or heat strengthen) such coated articles for purposes of tempering, bending, or the like in certain example instances.

In certain situations, designers of coated articles often strive for a combination of high visible transmission, substantially neutral color, low emissivity (or emittance), and low sheet resistance ($R_s$). High visible transmission for example may permit coated articles to be more desirable in certain window applications, whereas low-emissivity (low-E) and low sheet resistance characteristics permit such coated articles to block significant amounts of IR radiation so as to reduce for example undesirable heating of vehicle or building interiors.

However, heat treatment of coated articles typically requires use of temperature(s) of at least 580 degrees C., more preferably of at least about 600 degrees C. and still more preferably of at least 620 degrees C. The use of such high temperatures (e.g., for 5-10 minutes or more) often causes coatings to break down and/or causes one or more of the aforesaid desirable characteristics to significantly deteriorate in an undesirable manner. Those in the art strive for heat treatability in certain applications, coupled with acceptable optical and solar characteristics.

Consider the following heat treatable coated article with the below-listed layer stack, where the layers are listed in order from the 6 mm thick clear glass substrate outwardly.

| Layer<br>Glass Substrate | Thickness (Å) |
|---|---|
| $TiO_2$ | 33.1 |
| $Si_3N_4$ | 110 |
| ZnO | 100 |
| Ag | 107 |
| $NiCrO_x$ | 36.5 |
| $SnO_2$ | 482.7 |

-continued

| Layer<br>Glass Substrate | Thickness (Å) |
|---|---|
| $Si_3N_4$ | 110 |
| ZnO | 100 |
| Ag | 159.5 |
| $NiCrO_x$ | 36.5 |
| $SnO_2$ | 100 |
| $Si_3N_4$ | 193.4 |

While the aforesaid coated article is heat treatable, there is room for improvement with regard to thermal stability. For example, as shown in FIGS. 2-5, lengthy heat treatments at high temperatures tend to cause this coated article to suffer significant drops in visible transmission, significant changes in certain color value(s), and significant increases in sheet resistance ($R_s$). There is room for improvement in one or more of these respects.

Additionally, the aforesaid coated article is susceptible to scratching in certain instances, and is also sometimes characterized by high haze values following heat treatment.

In view of the above, it will be apparent to those skilled in the art that there exists a need for coated articles which are capable of realizing (a) improved thermal stability with regard to visible transmission, color, emissivity (or emittance), and/or sheet resistance ($R_s$); (b) improved mechanical durability such as scratch resistance; and/or (c) improved haze characteristics. In certain example embodiments, it may be desired that one or all of these characteristics can be achieved.

BRIEF SUMMARY OF EXAMPLE EMBODIMENTS OF THE INVENTION

In certain example embodiments of this invention, an interlayer comprising tin oxide is provided under an infrared (IR) reflecting layer so as to be located between respective layers comprising silicon nitride and zinc oxide.

Unexpectedly, it has been found that the use of such a tin oxide inclusive interlayer (or adhesion layer) results in significantly improved thermal stability, mechanical durability (e.g., scratch resistance), and haze characteristics.

For example, with regard to thermal stability, it has been found that the use of such a tin oxide inclusive interlayer results in a coated article which is capable of realizing one or more of: (a) less visible transmission shift due to heat treatment, (b) higher visible transmission following heat treatment; (c) less shifting of certain color value(s) due to heat treatment, (d) substantially neutral coloration following heat treatment; (e) more stable, or even decreasing, sheet resistance due to heat treatment, (f) lower sheet resistance and thus lower emissivity following heat treatment, and/or (g) improved haze characteristics following heat treatment. It has also been found that the provision of this tin oxide inclusive interlayer is also capable of significantly improving mechanical durability and haze characteristics of the coated article, compared to if the layer were not present.

These surprisingly results, which in certain example instances are associated with the use of the combination layer stack portion of glass ... $Si_xN_y/SnO_2/ZnO/Ag$ ..., are highly advantageous, since mechanical durability, higher visible transmission, lower emissivity, lower sheet resistance, reduced haze, and/or improved thermal stability are typically desired features in coated articles.

In certain example embodiments of this invention, there is provided a coated article comprising a coating supported by a glass substrate, the coating comprising: a first dielectric layer; a first infrared (IR) reflecting layer comprising silver located over at least the dielectric layer; a first layer comprising silicon nitride located over at least the first IR reflecting layer and the first dielectric layer; a first layer comprising tin oxide located over and contacting the first layer comprising silicon nitride; a first layer comprising zinc oxide located over and contacting the first layer comprising tin oxide, so that the first layer comprising tin oxide is located between and contacting the first layer comprising silicon nitride and the first layer comprising zinc oxide; a second IR reflecting layer comprising silver located over and contacting the first layer comprising zinc oxide; and at least another dielectric layer located over at least the second IR reflecting layer.

In certain other example embodiments of this invention, there is provided a coated article comprising a coating supported by a glass substrate, the coating comprising from the glass substrate outwardly; a layer comprising silicon nitride; a layer comprising tin oxide located over and contacting the layer comprising silicon nitride; a layer comprising zinc oxide located over and contacting the layer comprising tin oxide, so that the layer comprising tin oxide is located between and contacting the layer comprising silicon nitride and the layer comprising zinc oxide; an infrared (IR) reflecting layer located over and contacting the layer comprising zinc oxide; and at least another dielectric layer located over at least the IR reflecting layer.

In certain other example embodiments of this invention, there is provided a coated article including: a coating supported by a glass substrate, wherein the coating comprises first and second IR reflecting layers comprising silver which are spaced apart from one another by at least one layer comprising tin oxide, and wherein the coated article is capable of being heat treated for 18 minutes at a furnace temperature of about 650 degrees C. without realizing a sheet resistance increase of more than 0.1 ohms/square and/or a visible transmission decrease of more than 1% from the 8 minute mark to the 18 minute mark of such heat treatment, measured monolithically.

In still further example embodiments of this invention, there is provided a coated article including: a coating supported by a glass substrate, wherein the coating comprises first and second IR reflecting layers comprising silver which are spaced apart from one another by at least one layer comprising tin oxide, and wherein the coated article is capable of being heat treated at a furnace temperature of about 650 degrees C. for 12 minutes, and realizing at least one of the following due to such heat treatment: (a) a visible transmission that does not decrease between the 8 and 12 minute marks of such heat treatment; (b) a transmissive b* value which does not change by more than 0.5 from the 8 minute mark to the 12 minute mark of such heat treatment; and (c) a sheet resistance in units of ohms/square which does not increase from the 8 minute mark to the 12 minute mark of such heat treatment.

In other example embodiments of this invention, there is provided a coated article comprising a coating supported by a glass substrate, the coating comprising: a first dielectric layer; a first infrared (IR) reflecting layer comprising silver located over at least the dielectric layer; a first layer comprising silicon nitride located over at least the first IR reflecting layer and the first dielectric layer; a first layer comprising a metal oxide located over and contacting the first layer comprising silicon nitride; a first layer comprising zinc oxide located over and contacting the first layer comprising the metal oxide, so that the first layer comprising the metal oxide is located between and contacting the first layer comprising silicon nitride and the first layer comprising zinc oxide; a second IR reflecting layer comprising silver located over and contacting the first layer comprising zinc oxide; and at least another dielectric layer located over at least the second IR reflecting layer.

DETAILED DESCRIPTION OF EXAMPLES OF THE INVENTION

Coated articles herein may be used in applications such as IG window units, vehicle windows, monolithic architectural windows, residential windows, and/or any other suitable application that includes single or multiple glass substrates.

In certain example embodiments of this invention, an interlayer comprising tin oxide or the like is provided under an infrared (IR) reflecting layer. In certain example embodiments, the interlayer comprising tin oxide is located between respective layers comprising silicon nitride and zinc oxide. Surprisingly, it has been found that the use of such a tin oxide inclusive interlayer results in significantly improved thermal stability, improved mechanical durability (e.g., scratch resistance) and/or improved haze characteristics. In certain example embodiments of this invention, improved mechanical durability, thermal stability and/or corrosion resistance for heat-treatable low-E coated articles can be realized when thermodynamically stable silver based layers are deposited, and the use of the tin oxide is believed to aid in providing such silver based layers even though the tin oxide is not in direct contact with the silver in certain example embodiments of this invention. It is believed that the tin oxide may reduce damage to the zinc oxide which may otherwise be caused by silicon nitride directly contacting the zinc oxide in certain instances.

Figure 6A:
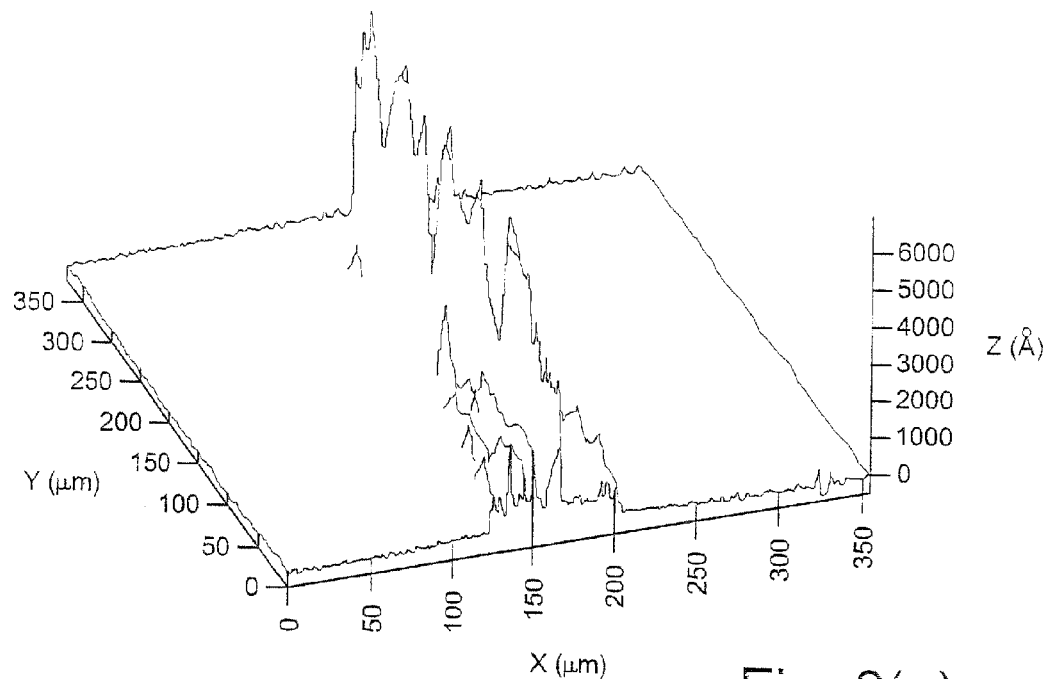
FIGS. 6(a) and 6(b) are surface morphology images illustrating improved scratch resistance of an Example of this invention compared to a Comparative Example (CE).
Figure 6B:
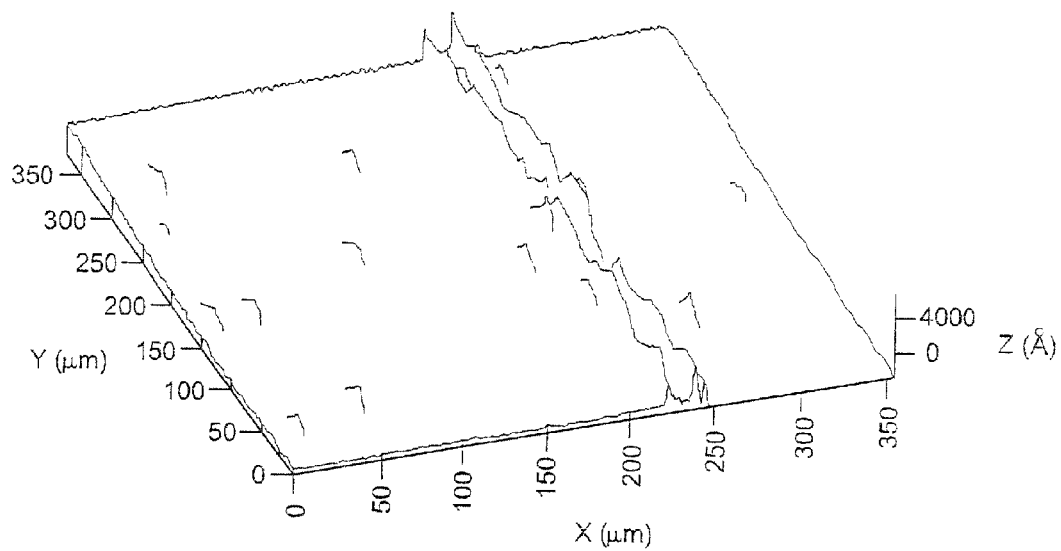

For example, with regard to thermal stability, it has unexpectedly been found that the use of such a tin oxide inclusive interlayer results in a coated article which is capable of realizing one or more of: (a) less visible transmission shift due to heat treatment, (b) higher visible transmission following heat treatment; (c) less shifting of certain color value(s) due to heat treatment, (d) substantially neutral coloration following heat treatment; (e) more stable, or even decreasing, sheet resistance due to heat treatment, (f) lower sheet resistance and thus lower emissivity following heat treatment, and/or (g) improved haze characteristics following heat treatment. Scratch resistance is also remarkably improved as shown in FIGS. 6(a)-(b).

These surprisingly results, which in certain example instances are associated with the use of the combination layer stack portion of $Si_xN_y/SnO_2/ZnO/Ag$, are highly advantageous since mechanical durability, higher visible transmission, lower emissivity, lower sheet resistance, reduced haze, and/or improved thermal stability are typically desired features in coated articles.

In certain example embodiments of this invention, the coating includes a double-silver stack, although this invention is not so limited in all instances.

For example, in certain example embodiments of this invention, heat treated coated articles having multiple IR reflecting layers (e.g., two spaced apart silver based layers) are capable of realizing a sheet resistance ($R_s$) of less than or equal to 3.0 (more preferably less than or equal to 2.5, even more preferably less than or equal to 2.1, and most preferably less than or equal to 2.0). In certain example embodiments, following heat treatment and as measured in monolithic form, coated articles herein are capable of realizing a visible transmission (Ill. C, 2 degree) of at least 75%, more preferably of at least 77%, and most preferably of at least 78%. Moreover, in certain example embodiments, following heat treatment and coupling to another glass substrate to form an IG window unit, IG window unit coated articles according to certain example embodiments of this invention are capable of realizing a visible transmission of at least 60%, more preferably of at least 65%, even more preferably of at least 66%, and in certain embodiments of at least 67%.

The terms "heat treatment" and "heat treating" as used herein mean heating the article to a temperature sufficient to achieve thermal tempering, heat bending, and/or heat strengthening of the glass inclusive article. This definition includes, for example, heating a coated article in an oven or furnace at a temperature of least about 580 degrees C., more preferably at least about 600 degrees C., for a sufficient period to allow tempering, bending, and/or heat strengthening. In certain instances, the HT may be for at least about 4 or 5 minutes.

Figure 1:
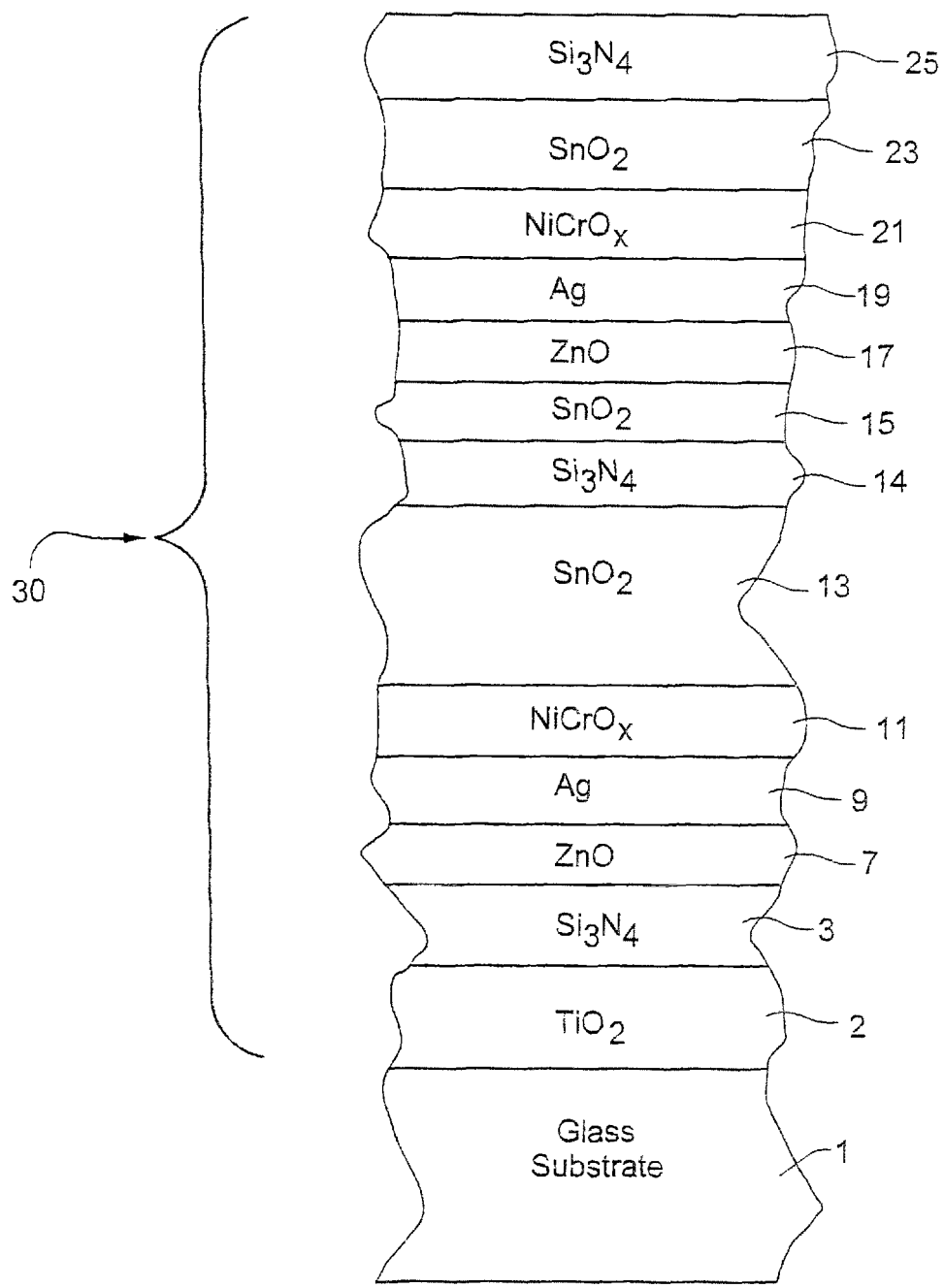
FIG. 1 is a cross sectional view of a coated article according to an example embodiment of this invention.

FIG. 1 is a side cross sectional view of a coated article according to an example non-limiting embodiment of this invention. The coated article includes substrate 1 (e.g., clear, green, bronze, or blue-green glass substrate from about 1.0 to 10.0 mm thick, more preferably from about 1.0 mm to 3.5 mm thick), and coating (or layer system) 30 provided on the substrate 1 either directly or indirectly. The coating (or layer system) 30 includes: bottom dielectric layer 2 which may be of or include titanium oxide (e.g., $TiO_2$) or the like, dielectric silicon nitride layer 3 which may be $Si_3N_4$, of the Si-rich type for haze reduction, or of any other suitable stoichiometry in different embodiments of this invention, first lower contact layer 7 (which contacts IR reflecting layer 9), first conductive and preferably metallic infrared (IR) reflecting layer 9, first upper contact layer 11 (which contacts layer 9), dielectric layer 13 (which may be deposited in one or multiple steps in different embodiments of this invention), another silicon nitride layer 14, tin oxide inclusive interlayer 15, second lower contact layer 17 (which contacts IR reflecting layer 19), second conductive and preferably metallic a reflecting layer 19, second upper contact layer 21 (which contacts layer 19), dielectric layer 23, and finally protective dielectric layer 25. The "contact" layers 7, 11, 17 and 21 each contact at least one IR reflecting layer (e.g., layer based on Ag). The aforesaid layers 2-25 make tip low-E (i.e., low emissivity) coating 30 which is provided or glass or plastic substrate 1.

In monolithic instances, the coated article includes only one glass substrate 1 as illustrated in FIG. 1. However, monolithic coated articles herein may be used in devices such as laminated vehicle windshields, IG window units, and the like. A laminated vehicle window such as a windshield typically includes first and second glass substrates laminated to one another via a polymer based interlayer (e.g., see U.S. Pat. No. 6,686,050, the disclosure of which is incorporated herein by reference). One of these substrates of the laminate may support coating 30 on an interior surface thereof in certain example embodiments. As for IG window units, an IG window unit may include two spaced apart substrates. An example IG window unit is illustrated and described, for example, in U.S. Pat. No. 6,632,491, the disclosure of which is hereby incorporated herein by reference. An example IG window unit may include, for example, the coated glass substrate 1 shown in FIG. 1 coupled to another glass substrate via spacer(s), sealant(s) or the like with a gap being defined therebetween. This gap between the substrates in IG unit embodiments may in certain instances be filled with a gas such as argon (Ar). An example IG unit may comprise a pair of spaced apart clear glass substrates each about 4 mm thick, one of which is coated with a coating 30 herein in certain example instances, where the gap between the substrates may be from about 5 to 30 mm, more preferably from about 10 to 20 mm, and most preferably about 16 mm. In certain example instances, the coating 30 may be provided on the interior surface of either substrate facing the gap.

Dielectric layer 2 is in direct contact with the glass substrate 1, and is optional. Dielectric layer 2 may be of or include $TiO_x$ in certain example embodiments of this invention, where x i2 from 1.5 to 2.0, more preferably about 2.0.

Dielectric layers 3 and 14 may be of or include silicon nitride in certain embodiments of this invention. Silicon nitride layers 3 and 14 may, among other things, improve heat-treatability of the coated articles, e.g., such as thermal tempering or the like. The silicon nitride of layers 3 and/or 14 may be of the stoichiometric type (i.e., $Si_3N_4$), or alternatively of the Si-rich type in different embodiments of this invention. For example, Si-rich silicon nitride 3 (and/or 14) combined with zinc oxide and/or tin oxide under a silver based IR reflecting layer may permit the silver to be deposited (e.g., via sputtering or the like) in a manner which causes its sheet resistance to be lessened compared to if certain other material(s) were under the silver. Moreover, the presence of free Si in a Si-rich silicon nitride inclusive layer 3 may allow certain atoms such as sodium (Na) which migrate outwardly from the glass 1 during HT to be more efficiently stopped by the Si-rich silicon nitride inclusive layer before they can reach the silver and damage the same. Thus, it is believed that the oxidation caused by heat treatment allows visible transmission to increase, and that the Si-rich $Si_xN_y$ in layer 3 can reduce the amount of damage done to the silver layer(s) during HT in certain example embodiments of this invention thereby allowing sheet resistance ($R_s$) to decrease or remain about the same in a satisfactory manner.

In certain example embodiments, when Si-rich silicon nitride us used in layer 3 and/or 14, the Si-rich silicon nitride layer as deposited may be characterized by $Si_xN_y$ layer(s), where x/y may be from 0.76 to 1.5, more preferably from 0.8 to 1.4, still more preferably from 0.85 to 1.2. Moreover, in certain example embodiments, before and/or after HT the Si-rich $Si_xN_y$ layer(s) may have an index of refraction "n" of at least 2.05, more preferably of at least 2.07, and sometimes at least 2.10 (e.g., 632 nm) (note: stoichiometric $Si_3N_4$ which may also be used has an index "n" of 2.02-2.04). In certain example embodiments, it has surprisingly been found that improved thermal stability is especially realizable when the Si-rich $Si_xN_y$ layer(s) as deposited has an index of refraction "n" of at least 2.10, more preferably of at least 2.20, and most preferably from 2.2 to 2.4. Also, the Si-rich $Si_xN_y$ layer in certain example embodiments may have an extinction coefficient "k" of at least 0.001, more preferably of at least 0.003 (note: stoichiometric $Si_3N_4$ has an extinction coefficient "k" of effectively 0). Again, in certain example embodiments, it has surprisingly been found that improved thermal stability can be realized when "k" for the Si-rich $Si_xN_y$ layer(s) is from 0.001 to 0.05 as deposited (550 nm). It is noted that n and k tend to drop due to heat treatment.

Any and/or all of the silicon nitride layers discussed herein may be doped with other materials such as stainless steel or aluminum in certain example embodiments of this invention. For example, any and/or all silicon nitride layers discussed herein may optionally include from about 0-15% aluminum, more preferably from about 1 to 10% aluminum, in certain example embodiments of this invention. The silicon nitride may be deposited by sputtering a target of Si or SiAl in certain embodiments of this invention.

Infrared (IR) reflecting layers 9 and 19 are preferably substantially or entirely metallic and/or conductive, and may comprise or consist essentially of silver (Ag), gold, or any other suitable IR reflecting material. IR reflecting layers 9 and 19 help allow the coating to have low-E and/or good solar control characteristics. The IR reflecting layers may, however, be slightly oxidized in certain embodiments of this invention.

The upper contact layers 11 and 21 may be of or include nickel (Ni) oxide, chromium/chrome (Cr) oxide, or a nickel alloy oxide such as nickel chrome oxide ($NiCrO_x$), or other suitable material(s), in certain example embodiments of this invention. The use of, for example, $NiCrO_x$ in these layers (11 and/or 21) allows durability to be improved. The $NiCrO_x$ of layers 11 and/or 21 may be fully oxidized in certain embodiments of this invention (i.e., fully stoichiometric), or alternatively may only be partially oxidized. In certain instances, the $NiCrO_x$ layers 11 and/or 21 may be at least about 50% oxidized. Contact layers 11 and/or 21 (e.g., of or including an oxide of Ni and/or Cr) may or may not be oxidation graded in different embodiments of this invention. Oxidation grading means that the degree of oxidation in the layer changes throughout the thickness of the layer so that for example a contact layer may be graded so as to be less oxidized at the contact interface with the immediately adjacent IR reflecting layer than at a portion of the contact layer(s) further or more/most distant from the immediately adjacent IR reflecting layer. Descriptions of various types of oxidation graded contact layers are set forth in U.S. Pat. No. 6,576,349, the disclosure of which hereby incorporated herein by reference. Contact layers 11 and/or 21 (e.g., of or including an oxide of Ni and/or Cr) may or may not be continuous in different embodiments of this invention across the entire IR reflecting layer.

Dielectric layer 13 may be of or include tin oxide in certain example embodiments of this invention. However, as with other layers herein, other materials may be used in different instances.

Lower contact layers 7 and/or 17 in certain embodiments of this invention are of or include zinc oxide (e.g., ZnO). The zinc oxide of layers 7 and 17 may contain other materials as well such as Al (e.g., to form $ZnAlO_x$). For example, in certain example embodiments of this invention, one or more of zinc oxide layers 7, 17 may be doped with from about 1 to 10% Al, more preferably from about 1 to 5% Al, and most preferably about 1 to 4% Al.

Interlayer 15 of or including tin oxide is provided under IR reflecting layer 19 so as to be located between silicon nitride layer 14 and zinc oxide layer 17. Surprisingly, as explained above, it has been found that the use of such a tin oxide inclusive interlayer 15 results in numerous improvements compared to a situation where the layer is not provided. For example, it has been found that the use of such a tin oxide inclusive interlayer 15 results in a coated article which is capable of realizing: (a) less visible transmission shift due to heat treatment, (b) higher visible transmission following heat treatment; (c) less shifting of certain color value(s) due to neat treatment, (d) substantially neutral coloration following heat treatment; (e) more stable, or even decreasing, sheet resistance due to heat treatment, (f) lower sheet resistance and thus lower emissivity following heat treatment, (g) improved haze characteristics following heat treatment, and/or (h) improved mechanical durability such as scratch resistance before and/or after heat treatment. Thus, in certain example embodiments of this invention, coated articles may be taken to higher temperatures during heat treatment and/or for longer times without suffering undesirable significant transmission drops and/or increases in sheet resistance. In certain alternative embodiments, it is possible to dope the tin oxide of layer 15 with other materials such as Al, Zn or the like. Alternatively, other metal oxide(s) may be used for layer 15 in certain instances.

Dielectric layer 23 may be of or include tin oxide in certain example embodiments of this invention. However, layer 23 is optional and need not be provided in certain example embodiments of this invention. Dielectric layer 25, which may be an overcoat in certain example instances, may be of or include silicon nitride (e.g., $Si_3N_4$) or any other suitable material in certain example embodiments of this invention. Optionally, other layers may be provided above layer 25. Layer 25 is provided for durability purposes, and to protect the underlying layers during heat treatment and/or environmental use. In certain example embodiments, layer 25 may have an index of refraction (n) of from about 1.9 to 2.2, more preferably from about 1.95 to 2.05.

Other layer(s) below or above the illustrated coating may also be provided. Thus, while the layer system or coating is "on" or "supported by" substrate 1 (directly or indirectly), other layer(s) may be provided therebetween. Thus, for example, the coating of FIG. 1 may be considered "on" and "supported by" the substrate 1 even if other layer(s) are provided between layer 2 and substrate 1. Moreover, certain layers of the illustrated coating may be removed in certain embodiments, while others may be added between the various layers or the various layers) may be split with other layer(s) added between the split sections in other embodiments of this invention without departing from the overall spirit of certain embodiments of this invention.

While various thicknesses and materials may be used in layers in different embodiments of this invention, example thicknesses and materials for the respective layers on the glass substrate 1 in the FIG. 1 embodiment are as follows, from the glass substrate outwardly:

Example Materials/Thicknesses; FIG. 1 Embodiment

| Layer<br>Glass (1-10 mm thick) | Preferred<br>Range (Å) | More<br>Preferred (Å) | Example (Å) |
|---|---|---|---|
| $TiO_2$ (layer 2) | 10-120 Å | 20-80 Å | 33 Å |
| $Si_xN_y$ (layer 3) | 40-450 Å | 70-300 Å | 110 Å |
| $ZnO_x$ (layer 7) | 10-300 Å | 40-150 Å | 100 Å |
| Ag (layer 9) | 50-250 Å | 80-120 Å | 107 Å |
| $NiCrO_x$ (layer 11) | 10-100 Å | 12-40 Å | 18 Å |

-continued

| Layer Glass (1-10 mm thick) | Preferred Range (Å) | More Preferred (Å) | Example (Å) |
|---|---|---|---|
| SnO$_2$ (layer 13) | 0-1,000 Å | 200-700 Å | 382 Å |
| Si$_x$N$_y$ (layer 14) | 50-450 Å | 80-200 Å | 110 Å |
| SnO$_2$ (layer 15) | 30-250 Å | 50-200 Å | 100 Å |
| ZnO$_x$ (layer 17) | 10-300 Å | 40-150 Å | 100 Å |
| Ag (layer 19) | 50-250 Å | 80-220 Å | 159 Å |
| NiCrO$_x$ (layer 21) | 10-100 Å | 20-45 Å | 36 Å |
| SnO$_2$ (layer 23) | 0-750 Å | 40-200 Å | 100 Å |
| Si$_3$N$_4$ (layer 25) | 0-750 Å | 80-320 Å | 193 Å |

In certain example embodiments of this invention, coated articles herein may have the following optical and solar characteristics set forth in Table 2 when measured monolithically (before any optional HT). The sheet resistances ($R_s$) herein take into account all IR reflecting layers (e.g., silver layers 9, 19).

Optical/Solar Characteristics (Monolithic; Pre-HT)

| Characteristic | General | More Preferred | Most Preferred |
|---|---|---|---|
| $R_s$ (ohms/sq.): | <=5.0 | <=4.0 | <=3.0 |
| $E_n$: | <=0.07 | <=0.04 | <=0.03 |
| $T_{vis}$ (Ill. C. 2°): | >=70% | >=74% | >=75% |

In certain example embodiments, coated articles herein may have the following characteristics, measured monolithically for example, after heat treatment (HT):

Optical/Solar Characteristics (Monolithic: Post-HT)

| Characteristic | General | More Preferred | Most Preferred |
|---|---|---|---|
| $R_s$ (ohms/sq.): | <=3.0 | <=2.5 | <=2.1 (or <=2.0) |
| $E_n$: | <=0.07 | <=0.04 | <=0.03 |
| $T_{vis}$ (Ill. C. 2°): | >=75% | >=77% | >=78% |
| Transmitted Haze: | <=0.6 | <=0.5 | <=0.4 |

Moreover, in certain example laminated embodiments of this invention, coated articles herein which have been heat treated to an extend sufficient for tempering, and which have been coupled to another glass substrate to form an IG unit, may have the following IG unit optical/solar characteristics.

Example Optical Characteristics (IQ Unit: Post-HT)

| Characteristic | General | More Preferred |
|---|---|---|
| $T_{vis}$ (or TY)(Ill. C. 2°): | >=60% | >=69% |
| $a^*_t$ (Ill. C. 2°): | -6 to +1.0 | -5 to 0.0 |
| $b^*_t$ (Ill. C. 2°): | -2.0 to +8.0 | 0.0 to 4.0 |
| L* (Ill. C. 2°): | 80-95 | 84-95 |
| $R_gY$ (Ill. C., 2 deg.): | 1 to 13% | 1 to 12% |
| $a^*_f$ (Ill. C., 2°): | -5.0 to +2.0 | -4.0 to +0.5 |
| $b^*_f$ (Ill. C., 2°): | -14.0 to +10.0 | -4.0 to +3.5 |
| L* (Ill. C. 2°): | 30-45 | 33-41 |
| $R_gY$ (Ill. C., 2 deg.): | 1 to 12% | 1 to 10% |
| $a^*_g$ (Ill. C., 2°): | -5.0 to +2.0 | -2.5 to +0.5 |
| $b^*_g$ (Ill. C., 2°): | -10.0 to +10.0 | -5.0 to 0 |
| L* (Ill. C. 2°): | 30-40 | 33-38 |
| SHGC (surface 2): | <=0.42 | <=0.38 |
| SHGC (surface 3): | <=0.47 | <=0.45 |

The following examples are provided for purposes of example only, and are not intended to be limiting unless specifically claimed.

EXAMPLES

The following Examples were made via sputtering on 6 mm thick clear glass substrates so as to have approximately the layer stacks set forth below. Example 1 is according to an example embodiment of this invention as shown in FIG. 1, whereas the Comparative Example is provided for purposes of comparison. The thicknesses are in units of angstroms (Å) and are approximations.

| Layer Glass Substrate | Comparative Example | Example 1 |
|---|---|---|
| TiO$_2$ | 33.1 | 33.1 |
| Si$_3$N$_4$ | 110 | 110 |
| ZnO | 100 | 100 |
| Ag | 107 | 107 |
| NiCrO$_x$ | 36.5 | 18.3 |
| SnO$_2$ | 482.7 | 382.7 |
| Si$_3$N$_4$ | 110 | 110 |
| SnO$_2$ | 0 | 100 |
| ZnO | 100 | 100 |
| Ag | 159.5 | 159.5 |
| NiCrO$_x$ | 36.5 | 36.5 |
| SnO$_2$ | 100 | 100 |
| Si$_3$N$_4$ | 193.4 | 193.4 |

It can be seen from the above that Example 1 and the Comparative Example are similar, except the tin oxide interlayer 15 is provided in Example 1 but is not in the Comparative Example. After being sputter deposited onto the glass substrates, the Example coated articles were heat treated in a manner sufficient for tempering.

FIGS. 2-5 compare Example 1 (IMP) to the Comparative Example (STD) with regard to thermal stability behavior/characteristics during and after heat treatments. FIGS. 2-5 are based on monolithic measurements, and furnace exposure time in minutes at about 650 degrees C. Of course, during heat treatment, the coated articles need not be heat treated for as long as is shown in FIGS. 2-5; FIGS. 2-5 illustrate lengthy heat treatment at high temperature in order to emphasize certain advantages of certain example embodiments of this invention.

Figure 2:
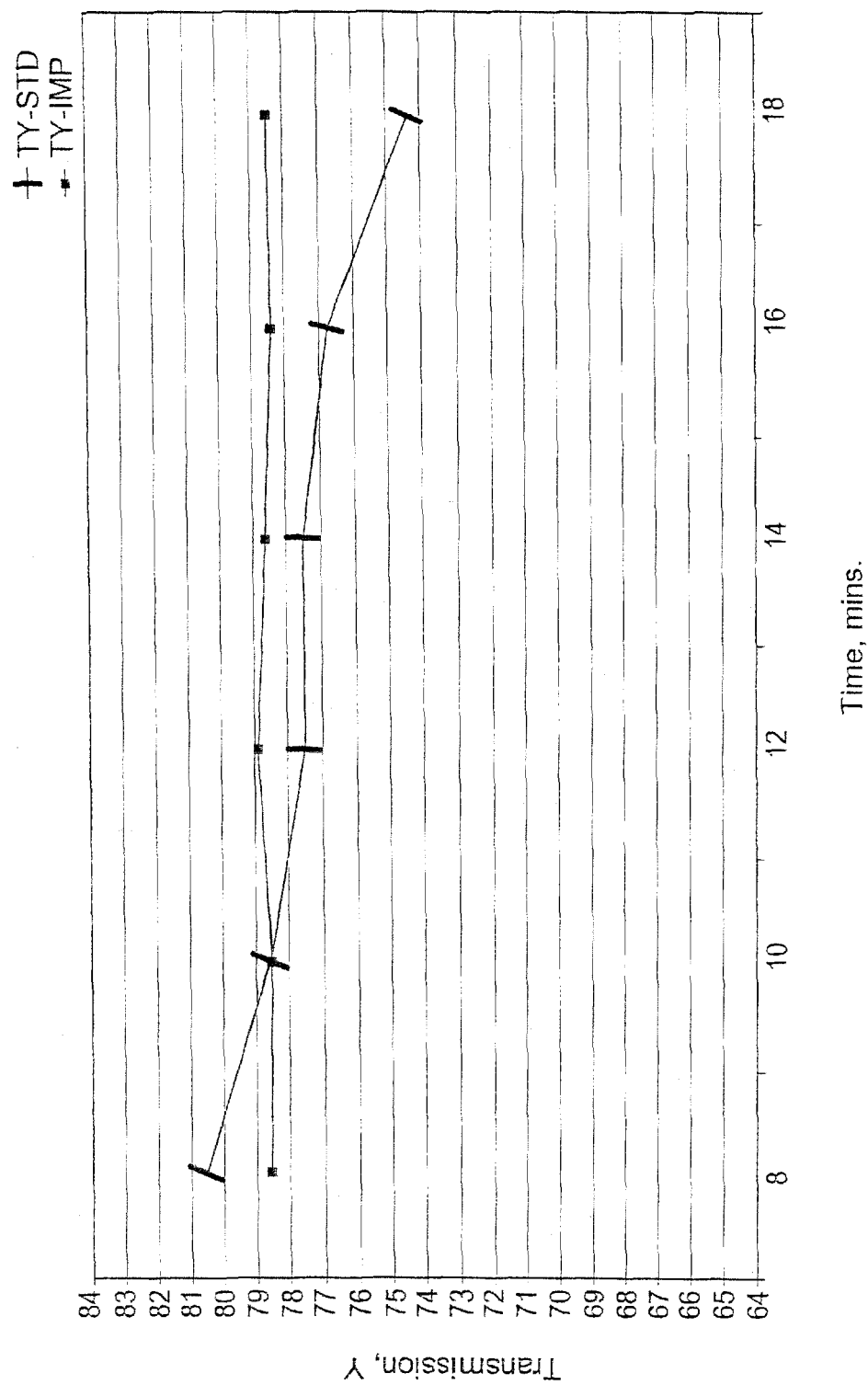
FIG. 2 is graph comparing changes in visible transmission (Ill. C, 2 degree obs.) due to heat treatment for an example embodiment of this invention versus a Comparative Example (CE).

FIG. 2 illustrates that visible transmission for the Comparative Example (STD) significantly dropped during heat treatment, whereas the visible transmission of Example 1 (IMP) did not. Thus, it can be seen that the provision of the tin oxide inclusive interlayer 15 in the coated article of Example 1 surprisingly resulted in less visible transmission shift during heat treatment, and is also capable of allowing higher visible transmission in the post-HT coated article.

Figure 3:
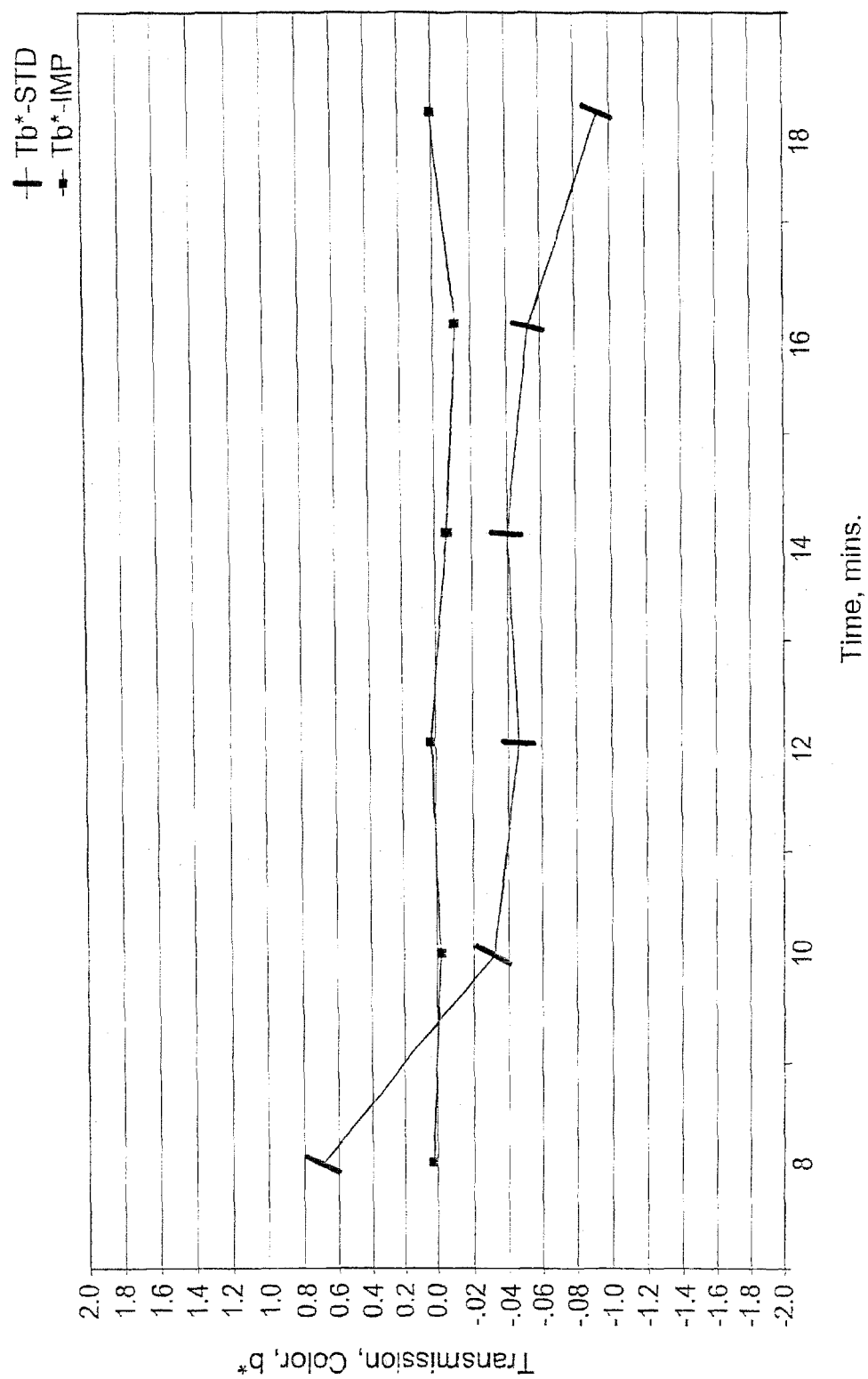
FIG. 3 is graph comparing changes in transmissive b* coloration (Ill. C, 2 degree obs.) due to heat treatment for an example embodiment of this invention versus the Comparative Example (CE).

FIG. 3 illustrates that transmissive b* coloration for the Comparative Example (STD) significantly changed (i.e., from about 0.7 to almost −1.0) during heat treatment, whereas the b* value for Example 1 (IMP) did not shift as much. Thus, it can be seen that the provision of the tin oxide inclusive interlayer 15 in the coated article of Example 1 surprisingly resulted in less transmissive b* color shift during heat treatment, and is also capable of allowing more neutral b* coloration in the post-HT coated article.

Figure 4:
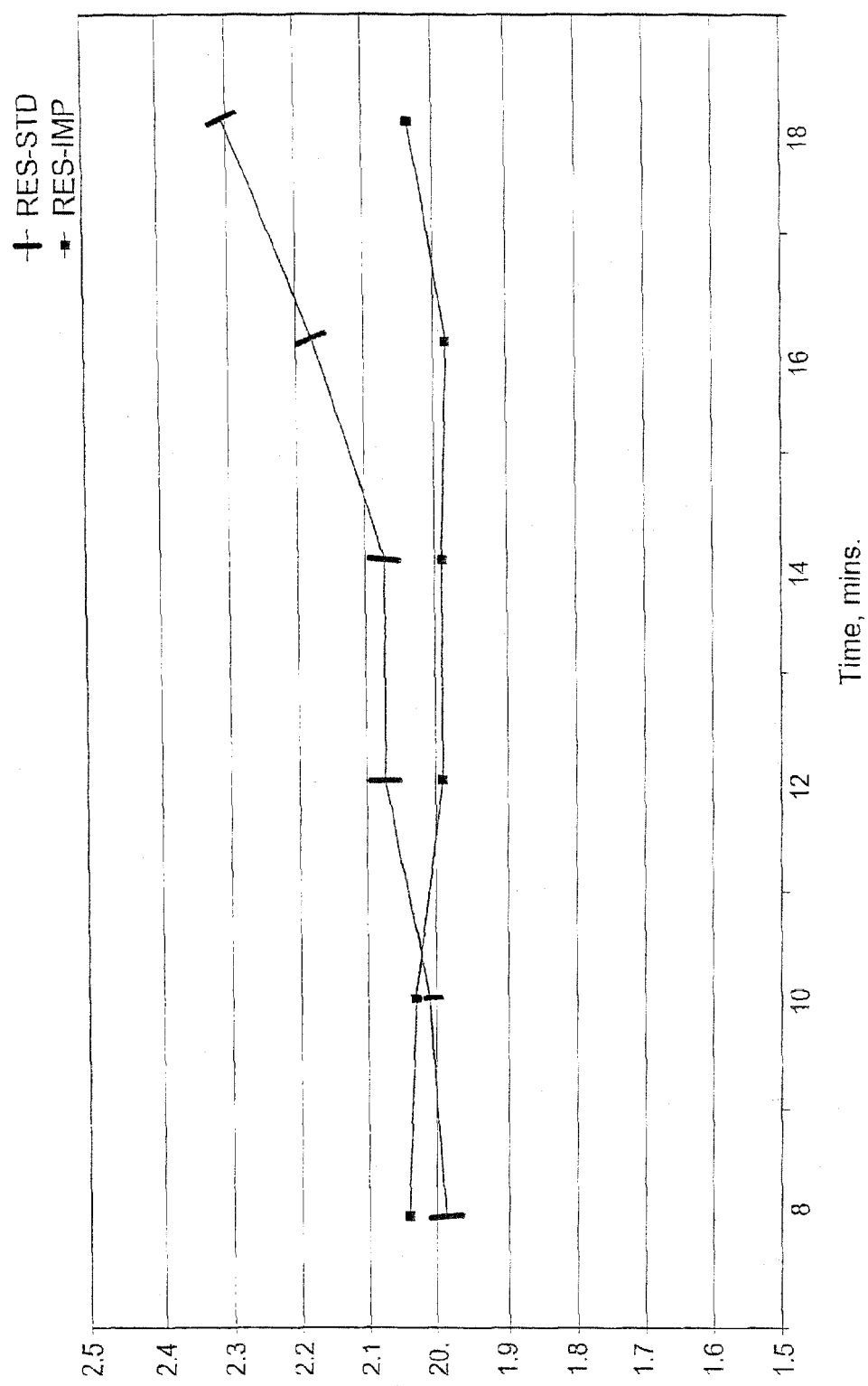
FIG. 4 is graph comparing changes in sheet resistance due to heat treatment for an example embodiment of this invention versus the Comparative Example (CE).

FIG. 4 illustrates that sheet resistance ($R_s$) of the Comparative Example (STD) significantly increased during heat treatment, whereas the sheet resistance of Example 1 (IMP) did not. Thus, it can be seen that the provision of the tin oxide inclusive interlayer 15 in the coated article of Example 1 surprisingly resulted in less sheet resistance increase during heat treatment, and is also capable of allowing improved (i.e., lower) sheet resistance in the post-HT coated article.

Figure 5:
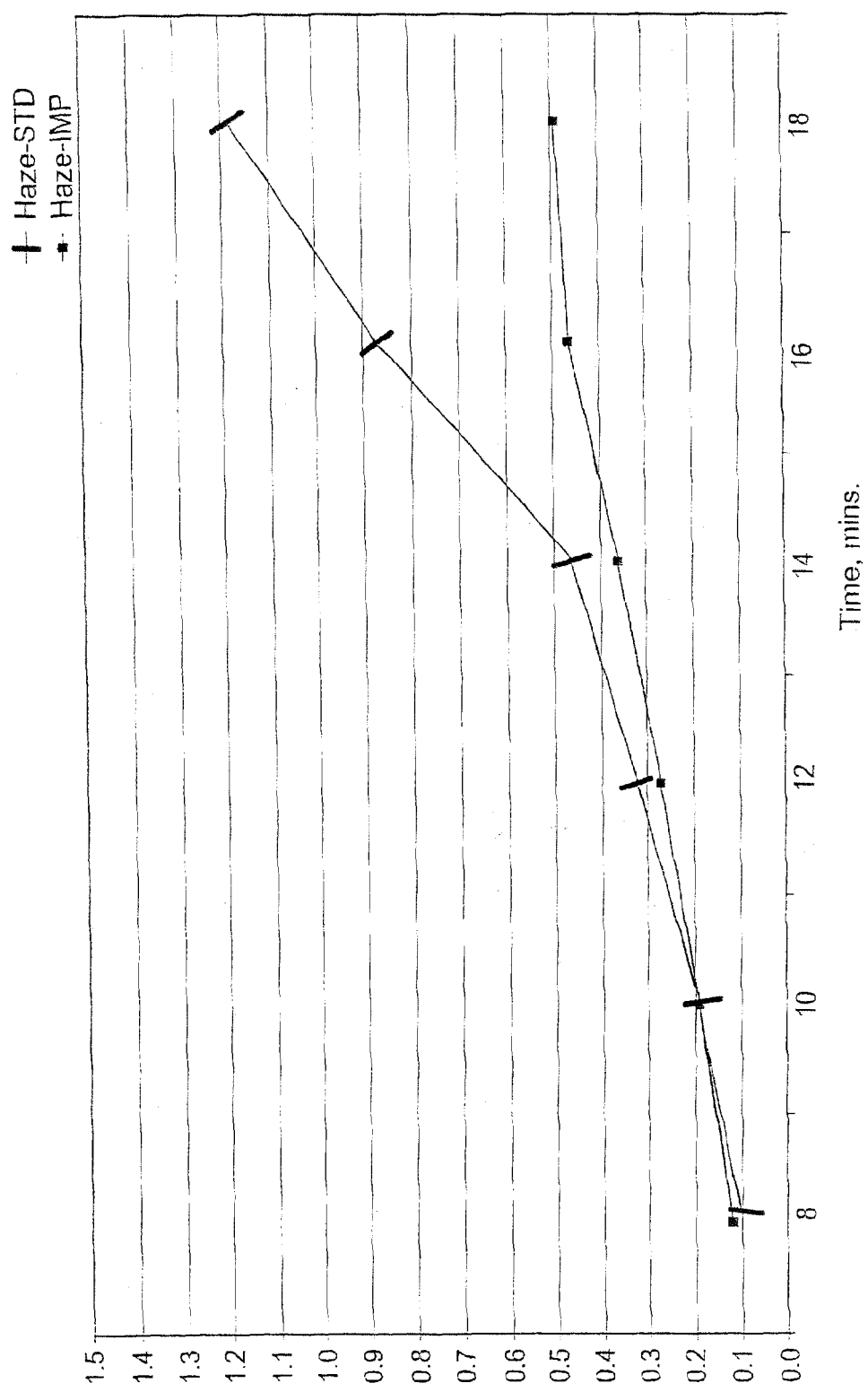
FIG. 5 is graph comparing changes in transmitted haze due to heat treatment for an example embodiment of this invention versus the Comparative Example (CE).

FIG. 5 illustrates that transmitted haze of the Comparative Example (STD) significantly increased much more than did that of Example 1 (IMP). Thus, it can be seen that the provision of the tin oxide inclusive interlayer 15 in the coated article of Example 1 surprisingly resulted in improved haze characteristics in the post-HT coated article.

It can be seen from FIGS. 2-5 that coated articles according to certain example embodiments of this invention are capable of being heat treated at a furnace temperature of about 650 degrees C. for 18 minutes, and realizing at least one of the following due to such heat treatment: (a) a visible transmission that does not decrease by more than 1% due to such heat treatment from the 8 minute mark to the 18 minute mark, and which preferably does not decrease at all due to such heat treatment from the 8 minute mark to the 18 minute mark; (b) a transmissive b* value which does not change by more than 1.0 from the 8 minute mark to the 18 minute mark, more preferably does not change by more than 0.5, and most preferably does not change by more than 0.3 due to such heat treatment from the 8 minute mark to the 18 minute mark; (c) a sheet resistance in units of ohms/square which does not increase by more than 0.1 due to such heat treatment from the 8 minute mark to the 18 minute mark, and which preferably does not increase at all due to such heat treatment from the 8 minute mark to the 18 minute mark; and (d) a transmitted haze value which does not increase by more than 0.5 due to such heat treatment from the 8 minute mark to the 18 minute mark, and which preferably is no greater than about 0.5 after such heat treatment measured monolithically.

In certain other example embodiments of this invention, coated articles with two silver based layers are capable of being heat treated at a furnace temperature of about 650 degrees C. for 12 minutes, and realizing at least one of the following due to such heat treatment: (a) a visible transmission that does not decrease between the 8 and 12 minute marks of such heat treatment; (b) a transmissive b* value which does not change by more than 1.0, more preferably does not change by more than 0.5, and most preferably does not change by more than 0.3 from the 8 minute mark to the 12 minute mark of such heat treatment; (c) a sheet resistance in units of ohms/square which does not increase from the 8 minute mark to the 12 minute mark of such heat treatment.

In view of FIGS. 2-5 discussed above, example advantage and unexpected results associated with certain example embodiments of this invention are clear.

FIGS. 6(a)-6(b) illustrate the surprisingly improved scratch resistance characteristics associated with certain example embodiments of this invention. FIG. 6(a) is a surface morphology image of scratches for the Comparative Example, whereas FIG. 6(b) is a surface morphology image of scratches for Example 1. It can be seen that Example 1 was much less susceptible to scratching than was the Comparative Example. In particular, the Comparative Example in FIG. 6(a) realized much taller features compared to Example 1 in FIG. 6(b) (about 6,000 Å compared to about 3,000 Å). Moreover, the Comparative Example in FIG. 6(a) realized much wider features compared to Example 1 in FIG. 6(b). These mechanical durability problems associated with the Comparative Example, shown in FIG. 6(a), often result in delamination which of course is undesirable. In contrast, the improved features of Example 1 shown in FIG. 6(b) do not result in delamination, thereby evidencing the significantly improved mechanical durability associated with certain example embodiment of this invention.

It is noted that before and after heat treatment for about eight minutes at a furnace temperature of about 650 degrees C., the coated article of Example 1 had the following characteristics, measured monolithically.

Example 1

Monolithic, Before/After HT

| Characteristic | pre-HT | Post-HT |
| --- | --- | --- |
| $T_{vis}$ (or TY)(Ill. C. 2°): | 72.82% | 78.53% |
| $a^*_t$ (Ill. C. 2°): | −2.96 | −1.79 |
| $b^*_t$ (Ill. C. 2°): | 2.49 | 0.02 |
| $R_fY$ (Ill. C., 2 deg.): | 6.56% | 5.97% |
| $a^*_f$ (Ill. C., 2°): | −6.75 | −7.99 |
| $b^*_f$ (Ill. C., 2°): | 9.89 | 7.20 |
| $L^*$ (Ill. C. 2°): | 30.77 | 29.35 |
| $R_gY$ (Ill. C., 2 deg.): | 7.21% | 5.94% |
| $a^*_g$ (Ill. C., 2°): | −1.31 | −1.99 |
| $b^*_g$ (Ill. C., 2°): | 0.79 | −1.53 |
| $L^*$ (Ill. C., 2°): | 32.29 | 29.26 |
| $R_s$ (ohms/square): | 2.68 | 2.04 |
| Haze: | 0.15 | 0.12 |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A coated article including a coating supported by a substrate, the coating comprising:
   a first dielectric layer;
   a first IR reflecting layer, wherein the first dielectric layer is located between at least the substrate and the first IR reflecting layer;
   a contact layer comprising Ni and/or Cr located over and directly contacting the first IR reflecting layer;
   a second IR reflecting layer, wherein the first IR reflecting layer is located between the substrate and the second IR reflecting layer;
   a dielectric film located between at least the first and second IR reflecting layers, wherein the dielectric film located between at least the first and second IR reflecting layers comprises first and second layers comprising tin oxide that are spaced apart by at least a layer comprising silicon nitride, and wherein the first layer comprising tin oxide is located over and directly contacting the contact layer comprising Ni and/or Cr and is located closer to the substrate than is the second layer comprising tin oxide; and
   wherein the first layer comprising tin oxide is from 200-700 angstroms thick and is thicker than is the second layer comprising tin oxide, and wherein the second layer comprising tin oxide is from 50-200 angstroms thick.

2. The coated article of claim 1, wherein the second layer comprising tin oxide is no greater than 100 angstroms thick.

3. The coated article of claim 1, wherein the layer comprising silicon nitride is from 80-200 angstroms thick.

4. The coated article of claim 1, wherein a layer comprising zinc oxide is located below and directly contacting the second IR reflecting layer.

5. The coated article of claim 1, further comprising another dielectric film located above the first and second IR reflecting layers which comprises a layer comprising silicon nitride located over a layer comprising tin oxide.

6. The coated article of claim 1, wherein neither said first nor second layer comprising tin oxide contacts a layer comprising silver.

7. The coated article of claim 1, wherein said IR reflecting layers comprise silver.

8. The coated article of claim 1, wherein the first and second layers comprising tin oxide each directly contact the layer comprising silicon nitride.

* * * * *